Patented June 13, 1950

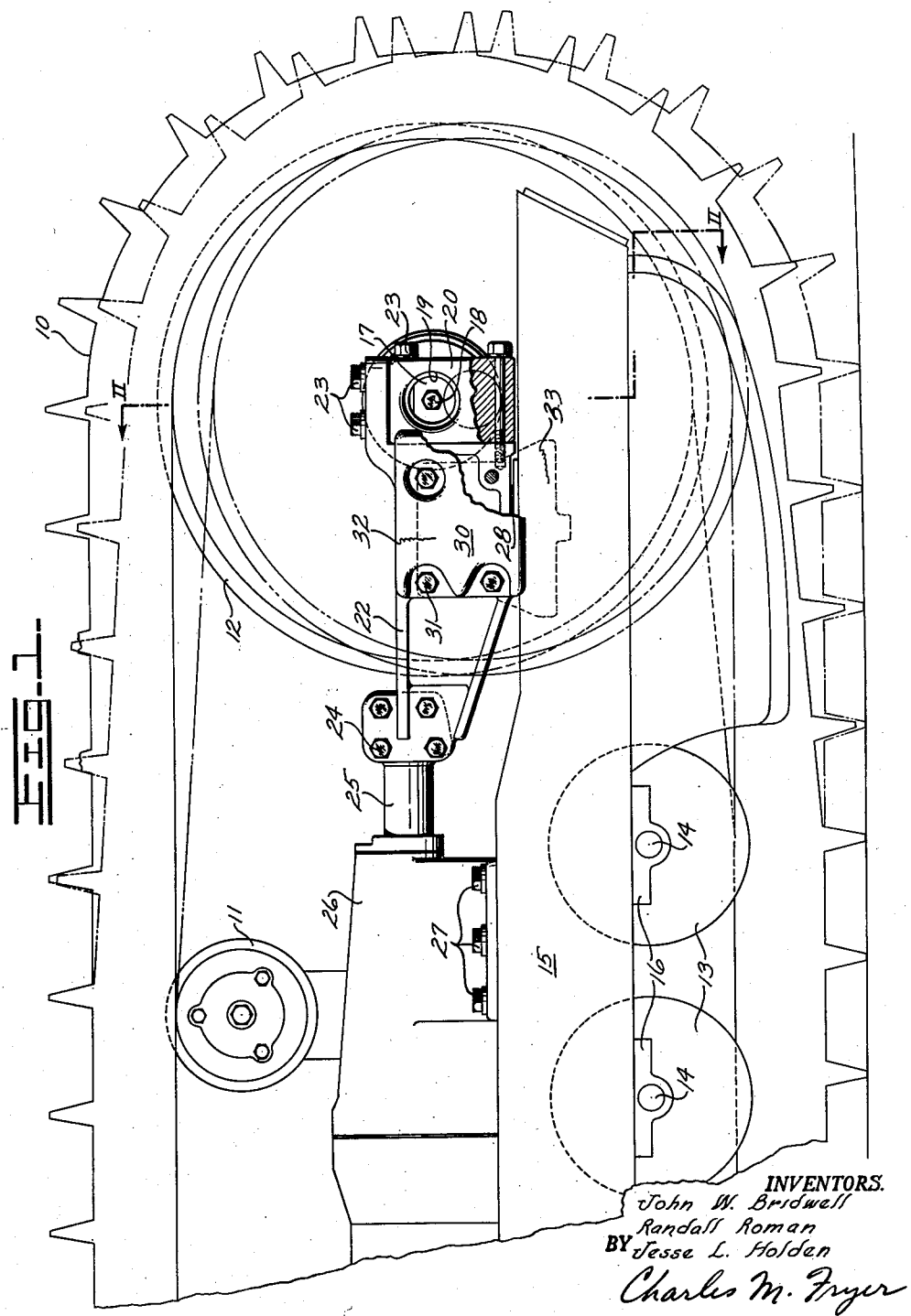

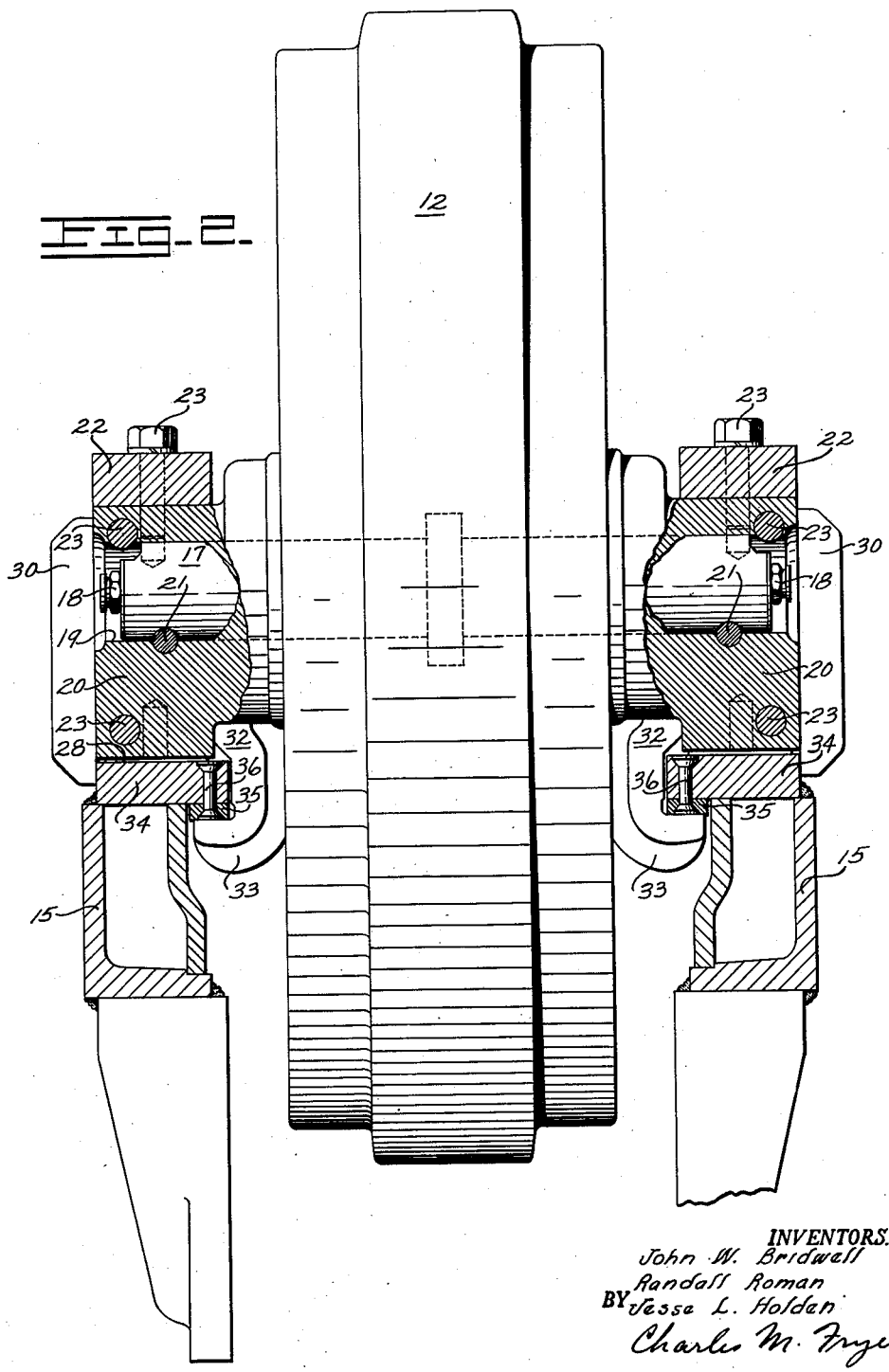

2,511,098

UNITED STATES PATENT OFFICE 2,511,098

ADJUSTABLE TRACK IDLER MOUNTING FOR TRACK TYPE TRACTORS

John W. Bridwell and Randall Roman, Peoria, and Jesse L. Holden, El Paso, Ill., assignors to Caterpillar Tractor Co., Peoria, Ill., a corporation of California Application May 15, 1948, Serial No. 27,288

3 Claims. (Cl. 305—9)

This invention relates to an adjustable mounting for a track idler such as is customarily associated with the endless track of a track type tractor and more specifically to an idler mounting which permits the idler to be raised or lowered with respect to the ground.

In a tractor of the endless track type, it is customary that each track be trained over a driving sprocket, usually disposed to the rear, an idler forwardly disposed, and a number of supporting track rollers between the sprocket and the idler and all rotatably supported by a tractor truck frame. The idler is also adapted for longitudinal sliding movement relative to the truck frame and is resiliently urged away from the driving sprocket to maintain the track under tension, as well as to permit the idler to move forward the sprocket in the event that foreign material becomes lodged on the inside of the track. It is customary, especially when operating the tractor on hard or rocky surfaces to incline that portion of the tractor forward of the front truck roller upwardly from the surface of the ground to permit the track shoes to more nearly align themselves parallel to the surface of the ground prior to actual contact therewith. This improves the riding qualities of the vehicle and materially reduces the rolling friction. However, when a tractor is equipped with front mounted equipment such as a bulldozer, excavating shovel or the like, in order to increase the stability or resistance to forward tipping of the tractor, it is desirable to eliminate the upward inclination of the track. In the past, this has been accomplished by replacing the standard idler with an idler having a larger diameter so that the track from the front idler to the final drive sprocket will lie in one plane. However, when an idler of a larger diameter is used, it is necessary to add more links to the track to compensate for the greater circumference of the idler. The necessity of replacing the idler as well as adding links to the track, makes this change difficult to accomplish in the field and requires special tools as well as the replacement parts.

It is an object of this invention to overcome the disadvantage referred to above and to provide an adjustable mounting for tractor track idlers which will permit the idler to be raised or lowered with respect to the surface of the ground, such adjustment being simply and easily accomplished without the necessity of making any changes in the length of the track. Other objects and advantages of the invention are made apparent in the following specification wherein the invention is described in detail by reference to the accompanying drawings.

In the drawings:

Fig. 1 is a view in side elevation of a portion of the track laying mechanism of a track type tractor in which one of the front idlers is illustrated as provided with a mounting constructed in accordance with the present invention, and Fig. 2 is an enlarged sectional view taken on line II—II of Fig. 1 illustrating the details of construction of the idler mounting.

In Fig. 1 of the drawings, a portion of one of the track laying mechanisms of a conventional track type tractor is illustrated as comprising an endless track schematically shown at 10, trained over a guide roller 11, an idler 12, and a number of truck rollers, two of which are illustrated at 13.

Each of the truck rollers 13 is rotatably mounted about a shaft 14 rigidly supported from a truck frame 15 by means of end caps 16. The truck frame 15, in the form of spaced box sections as is illustrated in Fig. 2, extends forwardly from a final drive sprocket (not shown) and supports substantially the entire weight of one half of the tractor.

Adjacent the forward end of the truck frame 15, the idler 12 is mounted for rotation on a shaft 17. A suitable grease fitting 18 is provided in each end of the shaft 17 to provide lubrication for the idler bearings (not shown). Each end of the shaft 17 is received in a bore 19 provided in a mounting block 20 and is held against rotation therein by means of a tapered lock pin indicated at 21. Each mounting block is rigidly secured to an arm of a bifurcated idler yoke 22 by means of cap screws 23.

As is illustrated in Fig. 1, the yoke 22 is supported on and is adapted for longitudinal sliding movement on the truck frame 15. The yoke is connected by means of cap screws 24 to the extending end of a rod 25 associated with a conventional recoil mechanism (not shown) but disposed within a cover 26, rigidly secured to the truck frame by means of cap screws 27. The recoil mechanism normally urges the idler yoke forwardly or away from the drive sprocket and serves to tension the track properly as well as to permit the idler to move toward the drive sprocket in the event foreign material becomes lodged on the inside of the track. Hardened wear plates indicated at 28 are associated with the yoke and truck frame and are provided to minimize wear between these members.

Lateral movement of the yoke with respect to the truck frame is restricted by a pair of side plates 30, only one of which is illustrated in Fig. 1 as rigidly secured to the yoke by means of bolts 31. Vertical movement of the yoke relative to the truck frame is prevented by a pair of thrust plates 32 (Fig. 2) which are also rigidly secured to the yoke 22 by means of the bolts 31. Each of the plates 32 is provided with an extending flange 33 which rides beneath an overhanging plate 34 forming a part of each of the box sections of the truck frame. Hardened wear strips 35 are rigidly secured to the lower side of the plates 34 by means of rivets 36 and serve to prevent wear on the truck frame.

It is to the construction of the idler mounting block 20 and the manner in which the idler shaft 17 is supported therein that this invention is particularly directed. As is illustrated by full lines in Fig. 1, the bore 19 in the supporting block 20 is located closer to the top edge of the block than to the bottom edge. With the mounting block in this position, the idler is supported relatively high with respect to the truck frames. Consequently the track assumes the position illustrated in full lines and inclines upwardly from the ground between the forward track roller 13 and the idler as is desirable for smooth traveling.

When it is desired to increase the stability of the tractor by eliminating the upward inclination of the track, the cap screws 23 are removed and the mounting blocks 20 are removed, then inverted and replaced. The mounting blocks are symmetrical save for the eccentric location of the bore 19 which receives the idler shaft, even the tapped holes for receiving the cap screws 23 being duplicated where necessary. With the block inverted, its bore 19 assumes the position indicated in broken lines in Fig. 1 and the idler and track also assume the broken line positions therein illustrated. Thus, with a few simple tools and no extra parts, the same idler wheel is effective to provide either a flat or inclined track depending upon the service to which the tractor is to be put.

We claim:

1. In a tractor with endless tracks having truck frames and idler wheels supported by the truck frames, idler wheel shaft blocks with bores to receive the idler wheel shafts, said bores being differentially spaced with relation to the top and bottom surfaces of the blocks whereby the elevation of the idler wheels may be altered by inverting the blocks.

2. In a tractor with endless tracks having truck frames and an idler wheel for each track, idler wheel recoil assemblies on the truck frames, idler wheel shaft blocks secured to said assemblies to support the idler wheel shafts, said blocks being reversibly supported and having eccentrically positioned bores to receive the shafts whereby the elevation of the idler wheels is changed by reversal of the blocks.

3. In an endless track having front idler wheels over which the track passes, shafts supporting the idler wheels, blocks bored for the reception and support of said shafts, the bores in said blocks being displaced vertically from center, and means to enable inverting of said blocks to alter the elevation of the idler wheel.

JOHN W. BRIDWELL.
RANDALL ROMAN.
JESSE L. HOLDEN.

REFERENCES CITED

The following references are of record in the file of this patent:

UNITED STATES PATENTS

| Number | Name | Date |
|---|---|---|
| 1,183,669 | Rider | May 16, 1916 |